Nov. 22, 1927.  
J. W. BRENKERT  
1,649,887  
VEHICLE DIRECTION AND STOP SIGNALING MEANS  
Filed March 15, 1926
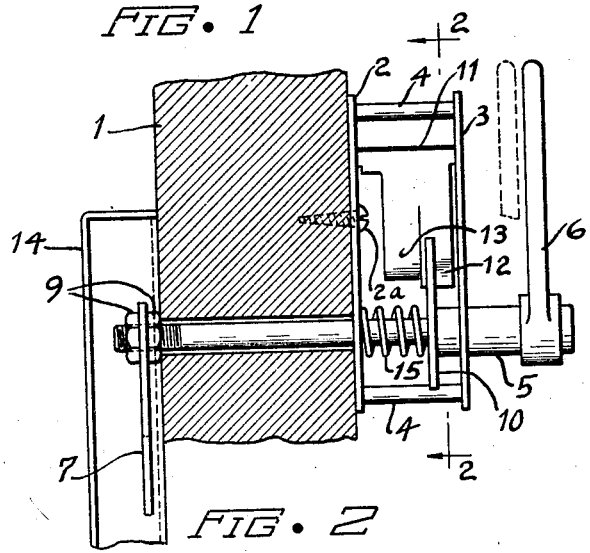
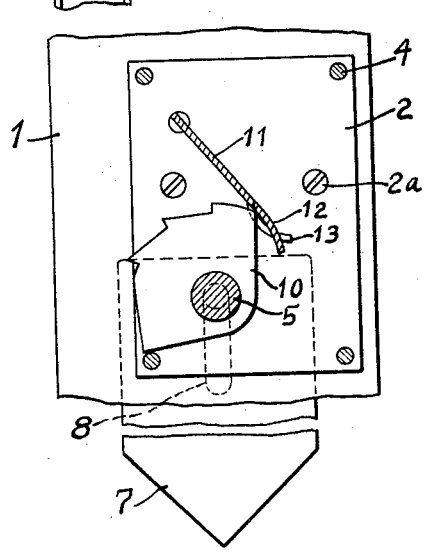  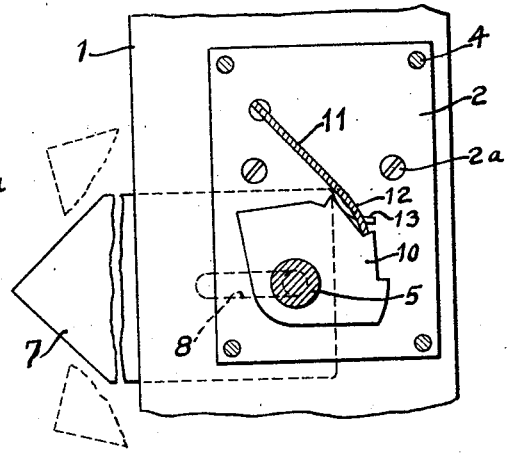
INVENTOR.  
JOSEPH W. BRENKERT  
BY  
A.B. Bowman  
ATTORNEY.

Patented Nov. 22, 1927.

1,649,887

UNITED STATES PATENT OFFICE.

JOSEPH W. BRENKERT, OF SAN DIEGO, CALIFORNIA.

VEHICLE DIRECTION AND STOP SIGNALING MEANS.

Application filed March 15, 1926. Serial No. 94,700.

My invention relates to a vehicle direction and stop signaling means, the principal object of the invention being to produce a device which will indicate when a turn or stop is to be made, and which will be particularly useful for inclosed automobiles.

A further object is to provide a signaling means of this class which may be easily mounted on either side of an automobile's windshield so that it may be readily operated, the one shown and described here being adapted for the left side.

Another object is to provide a signal in semaphore form in four positions for indicating a right turn, left turn, slow down and neutral.

Another object is to provide a signal arm of this class which is adjustable and may be extended different lengths for different uses.

A still further object is to provide a signaling means of this class which will be simple, inexpensive and durable in construction, with efficiency and reliability in operation.

With these and other objects in view as will appear hereinafter, my invention consists of certain novel features of construction, combination and arrangement of parts and portions as will be hereinafter described in detail and particularly set forth in the appended claims, reference being had to the accompanying drawing on which similar characters of reference refer to similar parts throughout the several views and wherein:

Figure 1 is a side elevational view of the signaling means, mounted on a fragmentary part of an inclosed automobile body post, showing the signaling arm in its neutral position and also showing by dotted lines the release position of the signaling lever. Fig. 2 is a sectional view taken on line 2—2 of Fig. 1. Fig. 3 is a sectional view taken on the same line as Fig. 2 and showing the signaling arm in a raised position indicating a turn to the left and also showing, by dotted lines, two other positions, namely a right turn and a slow down or stop position.

In the preferred embodiment of my invention, 1 indicates a left corner post portion of an inclosed automobile body. Side plates 2 and 3 are held together by pins 4 and firmly attached to body 1 by means of screws 2ª. A shaft 5, extending through the side plates 2 and 3 and through the body post 1, has a lever 6 keyed on the inner end which in turn is used to raise or lower a signaling arm 7 on the outer end of the shaft 5. The signaling arm 7 contains a slot 8 which allows for adjusting the distance between the pivot point and the end of the signaling arm 7 after which said arm is locked in position by means of the lock nuts 9.

A ratchet quadrant 10 is securely fastened to the shaft 5 and, when the signaling arm 7 is in a raised position, will engage with ratchet pawl 11 which is pivotally mounted between the plates 2 and 3, thereby holding the signaling arm 7 in the desired position until released.

The ratchet pawl 11 is formed with two tongues 12 and 13, the tongue 12 is turned inwardly at its end to engage with the ratchet quadrant 10 thereby maintaining the desired position of the signaling arm, and the tongue 13 is turned outwardly at its end to disengage with the ratchet wheel 10 thereby permitting the signaling arm to return to a lower position or to drop to the vertical or neutral position.

As the signaling arm 7 is normally in a vertical position, enclosed with a housing 14, by turning lever 6 the desired position can be acquired and also maintained by the engagement of ratchet wheel 10 and the inwardly curved tongue 12 on ratchet pawl 11.

To release the signaling arm 7 a slight pressure is applied to inner end of shaft 5 which will compress the coil spring 15 thereby moving the ratchet wheel 10 from the engaged position under the inwardly curved tongue 12 to the disengaged position under the outwardly curved tongue 13 thereby permitting the signaling arm 7 to assume its neutral position.

Although I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a vehicle direction and stop signaling means, a pair of spaced plates secured to the one side of the frame of said vehicle, a shaft slidably rotatably mounted in said plates and extending through said frame, a lever securely attached to one end, a signaling arm adjustably mounted on the opposite end, and a stationary casing secured to the other side of said frame for concealing said signaling arm when in neutral position.

2. In a vehicle direction and stop signaling means, a frame, a shaft rotatably mounted in said frame, a lever securely attached to one end of said shaft, a signaling arm adjustably mounted on the opposite end of said shaft, a ratchet quadrant rigidly secured to said shaft in said frame and a double ratchet pawl with oppositely turned ends adapted to engage and disengage said quadrant when said quadrant is shifted.

3. In a vehicle direction and stop signaling means, a frame, a shaft rotatably mounted in said frame, a lever securely attached to one end of said shaft, a signaling arm adjustably mounted on the opposite end of said shaft, a ratchet member rigidly secured to said shaft, a spring mounted on said shaft tending to hold said ratchet member in certain positions, said ratchet member and spring being located in said frame and a ratchet pawl engaging said ratchet member.

4. In a vehicle direction and stop signaling means, a frame, a ratchet member revolubly mounted in said frame and a ratchet pawl pivotally mounted in said frame and formed with two tongues, one of which turns inwardly at its end and the other outwardly at its end adapted to alternately engage and release said pawl from said member when shifted.

5. In a vehicle direction and stop signaling means, a revoluble and longitudinally shiftable shaft, a signal arm member adjustably mounted on one end of said shaft, a handle on the other end and ratchet and pawl means in connection with said shaft for regulating the revoluble movement of said shaft.

6. In a vehicle direction and stop signaling means, a revoluble and longitudinally shiftable shaft, a signal arm member adjustably mounted on one end of said shaft, a handle on the other end and ratchet and pawl means in connection with said shaft for regulating the revoluble movement of said shaft and spring means tending to hold said shaft inwardly longitudinally.

In testimony whereof, I have hereunto set my hand at Los Angeles, California, this 9th day of February, 1926.

JOSEPH W. BRENKERT.